Jan. 27, 1931.  O. F. ROHWEDDER  1,790,022
BREAD HANDLING MACHINE
Original Filed Jan. 26, 1928   3 Sheets-Sheet 2

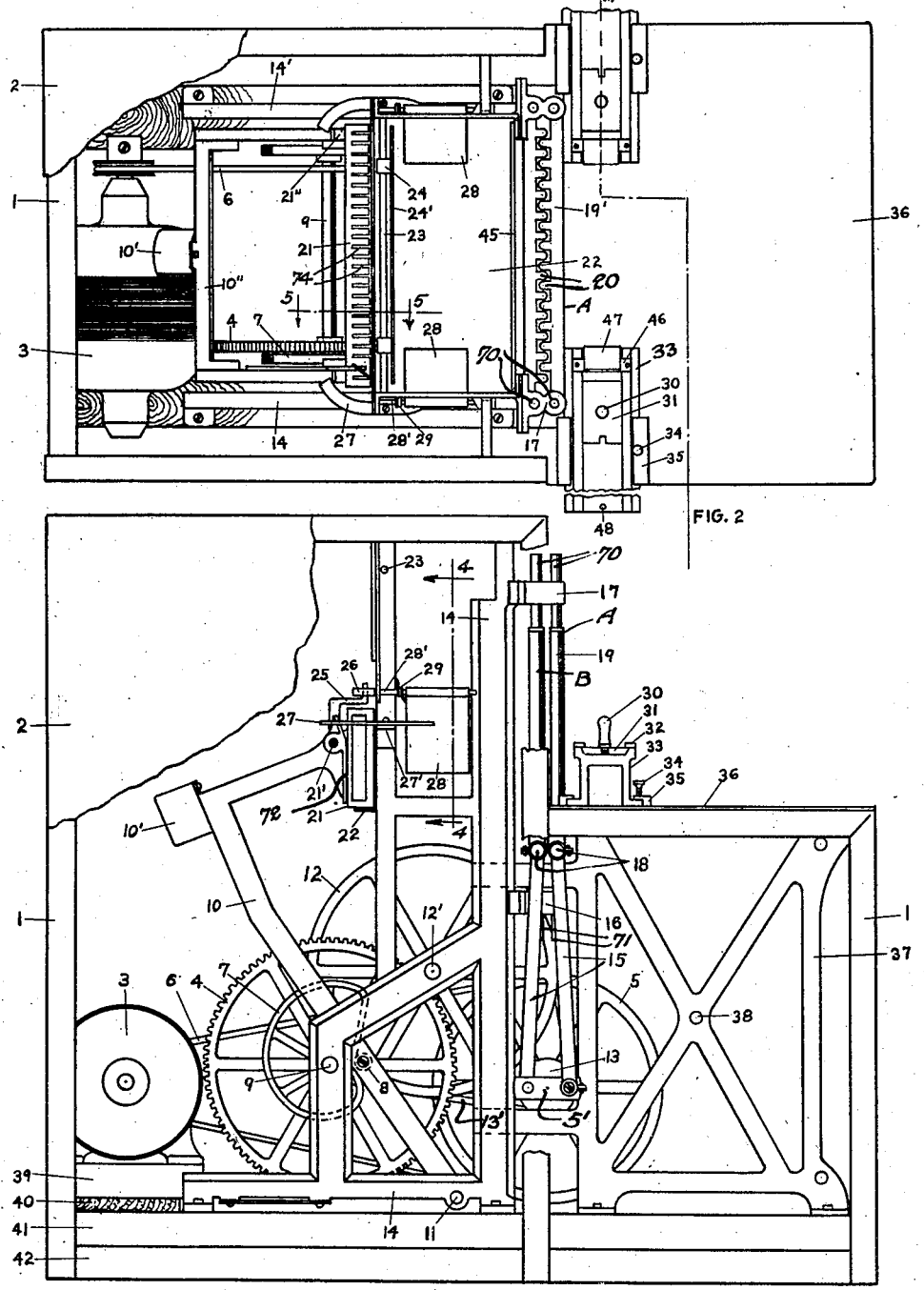
Jan. 27, 1931.    O. F. ROHWEDDER    1,790,022
BREAD HANDLING MACHINE
Original Filed Jan. 26, 1928    3 Sheets-Sheet 1

INVENTOR

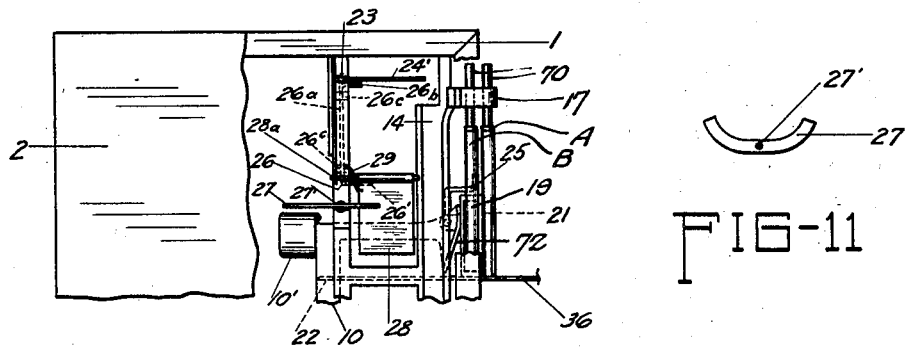
FIG-10  FIG-11
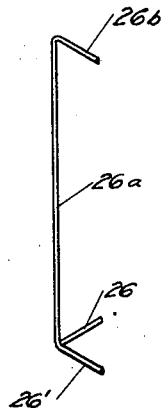
FIG-12  FIG-13
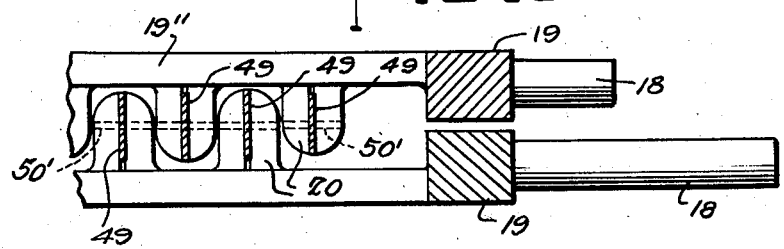

Patented Jan. 27, 1931

1,790,022

UNITED STATES PATENT OFFICE

OTTO F. ROHWEDDER, OF DAVENPORT, IOWA, ASSIGNOR TO MAC-ROH SALES & MANUFACTURING CO., OF DAVENPORT, IOWA, A CORPORATION OF DELAWARE

BREAD-HANDLING MACHINE

Application filed January 26, 1928, Serial No. 249,612. Renewed August 22, 1929.

This invention relates to bread slicing machines and particularly to feeding mechanisms therefor, and is an improvement on the slicing machine shown in U. S. Letters Patent No. 923,125 granted to Garrett A. Kinder on May 25, 1909.

One of the objects of this invention is to provide a bread slicing machine of new and improved design.

Another object is to provide a bread slicing machine of improved construction whereby bread can be rapidly and efficiently sliced without the use of manual labor.

Another object is to provide a bread slicing machine with new and efficient means for automatically feeding the loaves of bread to be sliced to the slicing means.

Another object is to provide a bread slicing machine with an automatic feeding means which receives the bread, centers it and discharges it in slicing position on the feeding table regardless of the size or length of the loaf.

A further object is to provide a bread slicing machine with novel means for retaining the sliced bread in loaf form until the slices can be secured together.

With the above and other objects in view, the present invention may be said to comprise the apparatus, as illustrated in the accompanying drawings, hereinafter described and particularly set forth in the appended claims, together with such variations and modifications thereof as will be apparent to one skilled in the art to which the invention appertains.

In the drawings which illustrate a suitable embodiment of the present invention, Figure 1 is a side elevation of the bread slicing machine, parts of the framework thereof being broken away to clearly show the operating mechanism.

Fig. 2 is a plan view of the machine shown in Fig. 1, parts of the framework being broken away to show the operating mechanism.

Fig. 10 is a partial side elevation of the upper portion of the bread slicing machine, a portion of the framework being broken away to show the pusher in its extreme forward position and to show the position of the primary bread support.

Fig. 11 is an enlarged plan view of one of the actuating levers for the secondary bread support.

Fig. 12 is an enlarged perspective view of the actuating rod for the primary bread support.

Fig. 13 is a partial transverse section taken through the assembled blade frames looking toward the bottom cross members thereof to show the cutting blades in substantial alignment.

In general, the present invention comprises a slicing machine for completely slicing a loaf of bread in a single operation and for continuously and successively slicing a plurality of loaves. The machine is provided with a novel feeding apparatus adapted to successively receive loaves to be sliced from a conveyor or other device (not shown), which apparatus, while one loaf is being sliced, receives another loaf which is automatically centered and lowered into slicing position as soon as the preceding loaf is completely sliced. The bread is automatically moved from the feed table by a pusher arrangement to reciprocating slicing knives, each knife being moved in a direction opposite to the adjacent knives. The machine is further provided with means for receiving the sliced bread from the cutting knives, which retains the slices in loaf form until they can be suitably secured together.

Figure 3:
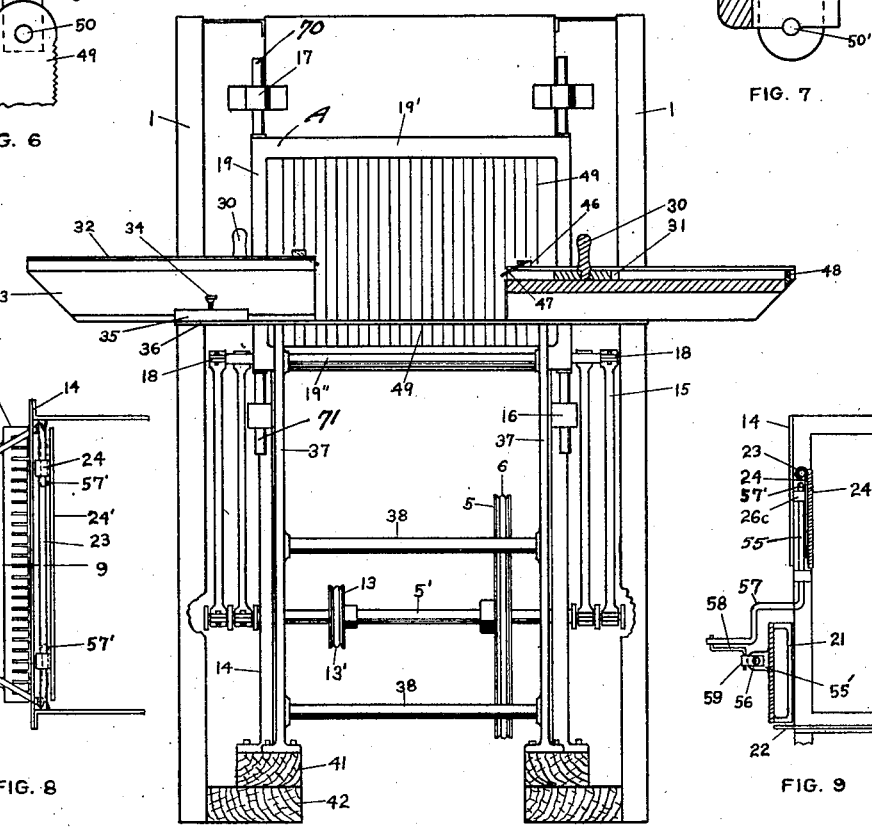
Fig. 3 is a transverse section of the slicing machine taken substantially on the line 3—3 of Fig. 2.

Referring to the accompanying drawings in which like numerals refer to like parts throughout the several views, the complete machine, as shown in Figs. 1 to 3, is supported on a base 42 by means of a subbase 41, the base 42 being provided with side and end frames 1 which are preferably covered by a sheathing 2 of suitable material to substantially enclose the operating parts of the machine.

Figure 6:
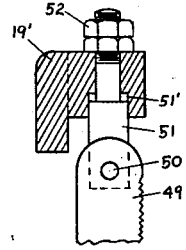
Fig. 6 is an enlarged section showing the means for holding the upper end of one of the cutting blades in the blade frame.
Figure 7:
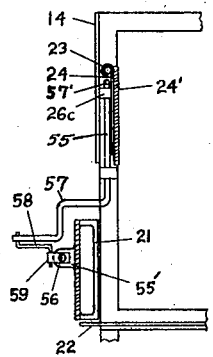
Fig. 7 is an enlarged section showing means for holding the lower end of the cutting blade in the blade frame.

The slicing device for the machine comprises a pair of open rectangular frames A and B, each of which embodies side members 19, and top and bottom members 19' and 19", respectively, interconnecting the side members 19. The top and bottom members 19' and 19" of each frame are formed with aligned lugs 20 which carry and support the cutting blades 49 under tension. As shown in Figs. 6 and 7, each blade 49 is secured to the lugs 20 by upper and lower pins 50 and 50', respectively, which extend through the ends thereof. The lower end of the blade 49 preferably extends through a vertical slot in the lower lug 20, and the transversely extending pin 59 bears against the lower face of the lug 20 at each side of the slot, as shown in Fig. 7. The upper pin 50 is preferably carried by a plunger member 51 having a threaded end of reduced diameter. The body portion of the plunger member 51 extends into a recess 51' formed in the upper lug 20 and the threaded end thereof extends through the lug 20 and is provided with nuts 52 threaded thereonto. It is apparent that when the nuts 52 are threaded onto the reduced end of the member 51, the blade 49 is put under tension and consequently held in position because of the transverse pins 50 and 50' which anchor the blade at its opposite ends.

The blade frames A and B are assembled to the machine in a vertical position with the lugs 20 of one frame overlapping or extending between the lugs 20 of the other frame, as shown in Fig. 2. Hence, in assembled position, the blades 49 of one frame lie between and are parallel with the blades of the other frame and also have their cutting edges in substantial alignment. The blade frames A and B are reciprocated upwardly and downwardly in opposite directions by suitable means which will soon be described, so that in operation, alternate blades move in the same direction. That is, one blade moves in one direction while the next adjacent blades move in the opposite direction, and vice versa.

Suitable side frames 14 are secured to the subbase 41 and each carries spaced lower and upper brackets 16 and 17, respectively, which serve as bearing guides for the reciprocating frame members A and B. The frame members A and B are provided at the extremities of their top cross members 19' with upwardly extending slide shaft members 70, and similarly at their bottom cross members 19" with downwardly extending slide shaft members 71. The slide shaft members 70 and 71 are journaled for sliding movement in the brackets 17 and 16, respectively, as shown in Figs. 1 to 3.

The blade frames A and B are reciprocated in opposite directions by links or connecting rods 15 which are pivotally secured at their upper ends to horizontally extending shafts 18 carried by the frames A and B at each side thereof. These connecting rods 15 are driven by and journaled on the bearing portions of double-throw cranks formed at the ends of a transverse rotatable shaft 5'. The shaft 5' is driven from a motor 3 by means of the pulley 5 and a suitable belt 6, the motor base 39 being mounted on a member 40 which is carried by the subbase 41. As shown in Fig. 1, the crank throws are arranged substantially 180 degrees apart, so that upon rotation of the shaft 5', one crank moves its attached blade frame in one direction, while the other crank moves its attached blade frame in the opposite direction through the medium of the connecting rods 15.

The bread to be sliced is automatically fed to the reciprocating cutting blades 49 by a pusher arrangement comprising a pair of cam driven levers 10 which are suitably pivoted at their lower ends to the side frames 14, as indicated at 11, and which are interconnected by means of a cross bar 10". The levers 10, as shown in Fig. 1, are substantially L-shaped and the free ends thereof are enlarged and formed with flat transverse faces 72. A bread pusher 21 is pivoted at its rear face to the enlarged ends of the levers 10 by pins 21', and when the levers are in normal retracted position, as illustrated in Fig. 1, the pusher 21 seats against the transverse faces 72 of the levers 10.

Figure 4:
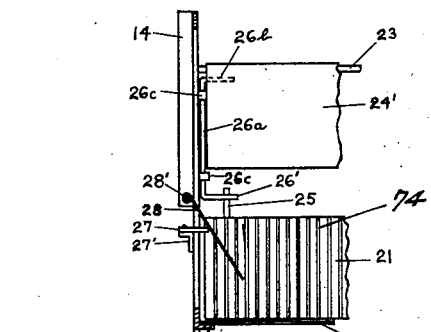
Fig. 4 is a partial section taken substantially on the line 4—4 of Fig. 1, showing the primary and secondary supports.

As shown in Figs. 1, 4 and 10, the side frames 14 are formed with inwardly extending horizontal flanges 73 to which a bed or feed table 22 is suitably secured. This feed table 22 extends horizontally between the side frames 14 and terminates adjacent the cutting blades 49. The bread pusher 21 at all times seats on the horizontal feed table 22 and is reciprocated thereon to and from the cutting blade 49 by the pivoted pusher levers 10. The forward face of the pusher 21 which engages the bread to be sliced, or being sliced, is formed with a plurality of vertical parallel slots 74 which are so arranged that when the bread is being sliced, the knife blades 49 may enter the slots 74 to permit the pusher 21 to clear the cutting edges of the blades and push the sliced bread beyond the same onto an apron 36.

The apron 36 is in horizontal alignment with the feed table 22 and is positioned on the opposite side of the cutting blades 49. The apron 36 is supported on auxiliary side frames 37 which are secured to the subbase 41 and are interconnected by cross bars 38.

A weight 10' is secured to the lever cross bar 10" rearwardly of the pivotal axis so that regardless of the position of the pusher the weight 10' will automatically move the pusher 21 back to its retracted position.

The pusher levers 10 are actuated by suitable cams 7 that are mounted on a rotatable shaft 9. The cams 7 contact with followers or rollers 8 which are carried by the levers 10. Rotation of the shaft 9 rotates the cams 7 and causes them to cooperate with the rollers 8 and swing the levers 10 back and forth about their connections 11 with the frames 14 as axes. The shaft 9 is driven by means of a gear 4 mounted thereon which meshes with a pinion gear (not shown) secured to a horizontal shaft 12', the shaft 12' having a pulley 12 thereon which is driven by means of a belt 13' from a pulley 13 suitably keyed or otherwise mounted on the main drive shaft 5'.

Bread is baked in loaves of different lengths and in order to facilitate the handling of the loaves in the slicing machine, both before and after slicing, it has been found very advantageous to provide means for receiving the loaves and discharging them on the feed table 22 in a centered slicing position. This is accomplished in the present invention by means of a primary bread support 24' and secondary supports 28 positioned above each other and above the bed or feed table 22. The bread is fed to the primary support 24' either manually or mechanically from a conveyor or other feeding device, which support 24' automatically discharges the bread onto the secondary supports 28, where it is self centered thereon. The supports 28, when the pusher is in its retracted position, automatically lower the loaf onto the feed table 22 in a centered position.

The secondary supports 28 which will now be described, are pivotally arranged at the sides of the feed table 22 and extend downwardly toward each other at an inclination of substantially 45 degrees so that when a loaf is deposited thereon from the primary support 24' the loaf will automatically tend to center itself as the supports 28 are moved downwardly or pivoted to their vertical planes to deposit the loaf on the feed table 22.

The secondary supports 28 are preferably pivoted at their outer edges to pivot bars 28' carried by the frames 14, the pivotal axes of which are horizontal and are arranged to lie outwardly and transversely of the pusher 21 and above the feed table 22, but below the upper edge of the pusher 21, as shown in Figs. 1 and 4. Torsion springs 29 coiled around the pivot bars 28' and having their ends engaging the frames 14 and upper surfaces of the secondary supports 28, continuously exert a downward pressure on the supports 28 to force them to a vertical position so that the pusher head 21 can move between the supports 28 in order to feed the bread deposited on the table 22 to the cutting blades 49.

The supports 28, however, are actuated from their vertical positions, as shown in Fig. 10, to their inclined positions, as shown in Fig. 4, by the action of the pusher head 21. Curved horizontal levers 27 transversely pivoted at 27' intermediate their ends to the side frames 14 are provided to engage the lower surfaces of the supports 28 at their forward ends, and to engage lugs or shoulders 21" formed on the rear face of the pusher 21 at their rearward ends. Referring to Figs. 2 and 4, the lugs 21" when the pusher 21 is in its retracted position, engage the rearward extremities of the levers 27 and pivot the same so that the forward extremities thereof firmly engage the secondary supports 28 and move the same to their inclined positions against the pressure of the springs 29. As the pusher 21 is moved forward, the lugs 21" thereon follow along the curved surfaces of the levers 27, which relieves the pressure on the supports 28, and the springs 29 then gradually move the supports to their vertical positions, so that by the time the forward face of the pusher 21 is adjacent the rear edges of the supports 28, the supports are completely pivoted to their vertical positions. The pusher 21 then can move between the supports 28, as shown in Fig. 10. As the pusher 21 moves rearwardly, the lugs 21' move along the levers 27 toward their rearward extremities and gradually pivot the levers 27 so that the supports 28 are moved to their inclined positions.

Figure 5:
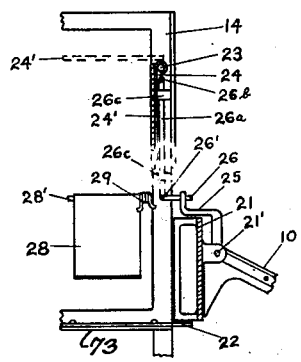
Fig. 5 is a partial section taken substantially on the line 5—5 of Fig. 2.

The primary support 24' and secondary supports 28 are alternately actuated by the action of the pusher 21. The primary support 24' is horizontally pivoted in a plane perpendicular to and above the pivotal axes of the secondary supports 28 on a pivot rod or shaft 23 by the bearings 24, as shown in Figs. 5 and 10. This primary support is arranged to swing from a vertical to a horizontal position directly above the secondary supports 28, as shown in Fig. 10, when the pusher 21 is in its forward position of feeding the bread slicing blades 49, and to again swing downwardly to a vertical position to deposit a loaf of bread on the inclined secondary supports 28 when the pusher 21 is in its retracted position. The primary bread support 24' is actuated by means of a bell crank 26a vertically pivoted in bearings 26c carried by the frame 14. The upper end or arm 26b of the bell crank 26a is adapted to bear against the lower surface of the primary support 24'. The lower end of the bell crank 26a is forked and one arm 26' thereof extends in the same direction as, and is parallel to, the upper arm 26b, the third arm 26 being perpendicular to the arm 26' as shown in Fig. 12.

The pusher 21 is provided with an upwardly extending post 25 at one end which, when the pusher moves forward, strikes the arm 26' and carries it forward, thereby revolving the vertical portion of the bell crank 26a, with the result that the upper arm 26b engages the lower face of the primary support 24' and swings the support to its horizontal position, the support 24' in its horizontal position being entirely supported by the upper arm 26b as shown in Fig. 10. The primary support 24' is thus positioned to receive the loaf of bread being cut. The post 25, as the pusher 21 returns to its rearward position and clears the secondary supports 28, engages the other arm 26 of the bell crank 26a and thus causes the arm 26b to swing out from under the primary support 24' so that the support 24' can swing downwardly to its vertical position and deposit the bread carried thereby onto the lower secondary supports, which supports during the backward movement of the pusher 21 have moved to their inclined bread receiving positions.

It is thus seen that the primary and secondary supports are alternately actuated by the pusher 21 to deposit a loaf of bread onto the feed table in a centered slicing position.

The sliced bread as it is moved over the apron 36 from the slicing blades 49 is retained in its loaf form by passing suitable staples longitudinally through the same from opposite ends. This is accomplished by fastening appliances secured to the apron 36 adjacent the blades 49, and which may be either manually or mechanically operated. Two of such appliances are mounted on the apron 36 in spaced alignment so that the sliced bread moves between the ends thereof. Each appliance 33 is formed to a box shape and is provided with outwardly extending flanges at the bottom thereof, which are engaged by suitable guideways 35 secured to the apron 36, and which can be adjusted longitudinally toward the center of the apron 36 and locked in any desired position by set screws 34.

The upper face of each device is formed to a broad channel shape within which a pusher plate 31 is slidably positioned and secured therein by guides 32 extending inwardly from the side edges of the channel. As shown in Figs. 1 and 3, the slide plate 31 is provided with a handle 30 which can be grasped by the operator. A stop pin 48 is provided at the outer extremity of the channel and a guide plate 47 is mounted on a cross bar 46 which is secured to the guides 32. The guide plate 47 retains and guides the staple (not shown) which is to be driven into the sliced bread by the pusher plate 31.

The stapling appliance just mentioned is more clearly described in detail and claimed in a copending application of even date, and is not claimed specifically herein.

Figure 8:
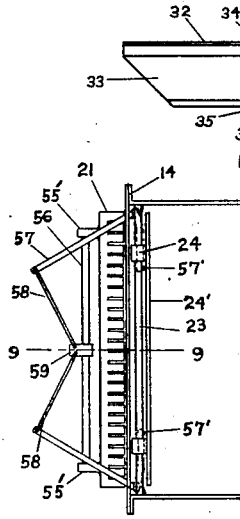
Fig. 8 is a plan view of an alternative actuating means for the primary bread support.
Figure 9:
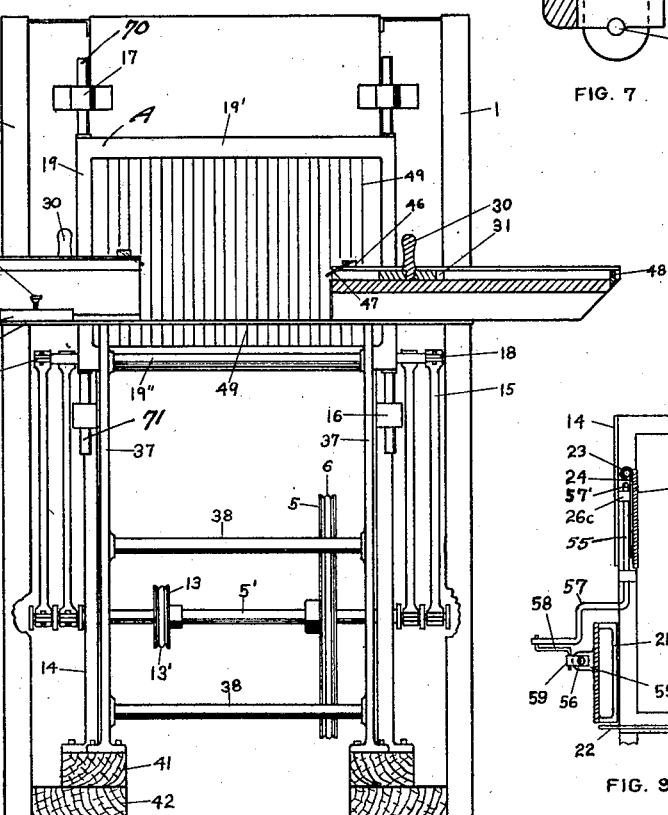
Fig. 9 is a sectional elevation taken substantially on the line 9—9 of Fig. 8.

Figs. 8 and 9 illustrate an alternative actuating device for the primary bread support 24', which comprises a pair of bell cranks 55 vertically pivoted to the frame 14 and having their upper arms 57' in contact with the lower face of the primary support 24'. The lower arms 57 of the bell cranks 55 are angularly arranged with respect to the upper arms 57' and are extended toward each other. Each lower arm 57 is connected by a link 58 to a block member 59 carried by a shaft 56, the shaft 56 being secured to the pusher head 21 by lugs 55'. As shown in Fig. 9, the long lower arms 57 of the bell cranks 55 are so bent that the pusher head 21 will clear the same when it is actuated. As the pusher head 21 moves forward, the links 58 pivoted thereto and to the bell crank arms 57, rotate the bell cranks and thus force the upper arms 57' to move forward under the primary support 24' and pivot the support to its horizontal position.

In operation, a loaf of bread is mechanically or manually placed upon the primary support 24' when the support is in its horizontal position, the pusher head 21 being in its forward position. The pusher 21 is returned to its rearward position by the action of the counterweight 10' and while it is being returned and at the instant the pusher 21 clears the secondary supports 28, the curved levers 27 bear against the secondary supports 28 and move the same to the inclined position shown in Fig. 4. Immediately thereafter the post 25 contacts with the arm 26 of the bell crank 55 and rotates the same, thus moving the upper arm 26b from under the primary support 24'. This allows the primary support 24' to swing downwardly and deposit the loaf of bread on the secondary supports 28. By this time the pusher 21 has reached its rearmost position and again starts forward. The secondary supports 28, as the pusher 21 starts forward, gradually move to their vertical positions because of the pressure of the springs 29, and the bread is self centered thereon, as the supports 28 pivot, and finally drops to the feed table 22. The pusher 21 continues its forward movement along the feed table 22 between the secondary supports 28 and feeds the bread to the cutting blades 49. While the pusher 21 is moving forward, the post 25 thereon engages the lower arm 26' of the bell crank and raises the primary support 24' to its horizontal position. The pusher 21 continues on its forward movement and feeds the loaf of bread past the cutting blades 49, pushes the slices onto the table 36, and starts to move rearwardly. The operation just described is then repeated. As the sliced bread is moved onto the apron 36 between the adjacent ends of the fastening device 33, the pusher plates 31 are manually moved toward each other to drive the staples, which have previously been positioned in the channels thereof, into the ends of the sliced bread. The staples are of such length that they overlap at the center of the loaf and securely hold the slices together in loaf form, so that the loaf can be easily handled without separating.

It is apparent from the drawings and foregoing description that the present invention provides an improved device for slicing bread in large quantities, especially in bakeries.

It is also apparent that the bread while being sliced is not handled by hand, and that considerable expense is saved because of the elimination of manual labor and the consequent time element.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. In a bread slicing machine, a feeding appliance comprising an upper primary bread support pivotally mounted upon the frame of the machine, a pair of lower secondary bread supports pivotally mounted upon the frame of the machine, and means for alternately actuating said supports.

2. In a bread slicing machine, the combination with a frame, of a stationary table mounted on said frame, means mounted adjacent the table for slicing the bread, a pusher movably mounted adjacent the table, and a pair of springheld guides pivotally mounted at the ends of the table for receiving the bread and discharging the same onto said table, said guides being so arranged that the bread self centers itself thereon.

3. In a bread slicing machine, the combination with a frame, of a stationary table mounted on said frame, means mounted adjacent the table for slicing the bread, a pusher movably mounted adjacent the table, a pair of springheld guides pivotally mounted at the ends of the table, and means in contact with the giudes and actuated by the pusher for moving said guides into a horizontal position as the pusher is retracted.

4. In a bread slicing machine, the combination with a frame, of a stationary table, means mounted adjacent the table for slicing the bread, a pusher movably mounted adjacent the table, a pair of spring held guides pivotally mounted at the ends of the table, and curved levers pivoted upon the frame and bearing at one end against the pusher, and at their opposite ends against the guides.

5. In a bread slicing machine, the combination with a frame, of a stationary table, means mounted adjacent the table for slicing the bread, a pusher movably mounted adjacent the table, a pair of springheld guides pivotally mounted at the ends of the table for supporting a loaf of bread, said guides being so arranged that the bread is self centered thereon, curved levers pivoted upon the frame and bearing at one end against the pusher and at their opposite ends against the guides, and springs secured to the guides and exerting constant pressure upon them in the direction of the adjacent ends of the curved levers.

6. In a bread slicing machine, a feeding appliance comprising a frame, a table, a movably mounted pusher adapted to be moved over the table, an upper support pivotally mounted on the frame above and longitudinally of the table, a pair of resiliently mounted lateral supports pivoted on the frame transversely of the table near the ends thereof and below the upper support, actuating levers and linkage connected to the pusher and to the supports for alternately actuating the upper and lower supports as the pusher travels across the table.

7. In a bread slicing machine, the combination with a frame, of a stationary table, cutting means mounted adjacent the table for slicing the bread, a pusher movably mounted adjacent the table, a pair of springheld guides pivotally mounted at the ends of the table, an apron mounted on the frame adjacent the cutting means, and a pair of staple-driving appliances adjustably secured upon the apron adjacent the path of the bread as it leaves the cutting means.

8. In a bread slicing machine, the combination with a frame, of a stationary table, cutting means mounted adjacent the table for slicing the bread, a pusher movably mounted adjacent the table, a pair of springheld guides pivotally mounted at the ends of the table, an apron mounted on the frame adjacent the cutting means, and a pair of fastening appliances adjustably secured upon the apron adjacent the path of the bread as it leaves the cutting means.

9. In a bread slicing machine, cutting means for slicing the bread, a feed table adjacent one side of the slicing means for receiving the bread to be sliced, an apron adjacent the other side of said cutting means, movable means adjacent said table for moving the bread through said cutting means onto said apron, and a staple driving device mounted upon said apron adjacent the path of the sliced bread as it leaves the cutting means, for securing the slices together in loaf form.

10. In a bread slicing machine, cutting means for slicing bread, a table adjacent said cutting means for supporting the loaf of bread being sliced, and pivoted supporting means spaced from said table for discharging a loaf of bread onto said table in slicing position.

11. In a bread slicing machine, the combination with a slicing means, of a table adjacent said slicing means for supporting a loaf of bread in slicing position, a pusher movable over said table for feeding the loaf supported by said table to said slicing means, and pivoted supporting means adjacent said table for discharging another loaf thereonto in slicing position after the loaf being sliced has moved from said table past said slicing means.

12. In a bread slicing machine, the combination with a slicing means, of a table adjacent said slicing means for supporting a loaf of bread in slicing position, a pusher movable back and forth over said table and adapted upon its forward movement to feed the loaf supported by said table to said slicing means, and pivoted means for receiving and supporting a loaf of bread above said table, said means being actuated by the movement of said pusher after said first mentioned loaf has been sliced, to discharge said last mentioned loaf onto said table in slicing position.

13. In a bread slicing machine, a feeding appliance comprising a bread supporting table, a movably mounted pusher adapted to move a loaf of bread over said table, a pivotally mounted upper support positioned above and longitudinally of the table, a pair of pivotally mounted lower supports positioned transversely of and adjacent the ends of said table, and between said upper support and table, and means connecting said pusher and supports for alternately actuating said supports as said pusher moves across said table, whereby a loaf of bread carried by said upper support is progressively transferred to said lower supports and to said table.

14. In a bread slicing machine, a feeding appliance comprising a table, a movable primary support mounted above said table, a pair of movable secondary supports positioned between said table and upper support and near the ends of said table, and means for alternately moving said supports to progressively transfer a loaf of bread carried by said primary support to said secondary supports and to said table.

15. In a bread slicing machine, a feeding appliance comprising a table, a movable primary support mounted above said table for supporting a load of bread, a pair of spaced movable secondary supports positioned between said table and primary support for receiving the load of bread from said primary support, said secondary supports being so arranged that the loaf of bread received from said primary support self centers itself thereon, and means for alternately moving said primary and secondary supports to progressively transfer a loaf of bread carried by said primary support to said secondary supports and to said table.

16. In a bread slicing machine, the combination with a slicing means, of movable means for feeding a loaf of bread to and through said slicing means, and pivoted supporting means for discharging another loaf of bread adjacent said slicing means in slicing position after the loaf being sliced has moved past said slicing means.

17. In an automatic bread loaf slicing machine, in combination, a frame, slicing mechanism mounted on the frame, and means for successively feeding the loaves for slicing to the slicing mechanism, said feeding means including a stationary feed plate, and an oscillatory member for successively delivering the loaves one by one to the feed plate.

18. In an automatic bread loaf slicing machine comprising, in combination, a stationary feed plate, and an oscillatory member for successively delivering the loaves one by one to and upon the feed plate from a plane thereabove.

In testimony whereof he affixes his signature.

OTTO F. ROHWEDDER.